United States Patent [19]

Anderson et al.

[11] 4,017,680

[45] Apr. 12, 1977

[54] METHODS AND APPARATUS INVOLVING LIGHT PEN INTERACTION WITH A REAL TIME DISPLAY

[75] Inventors: Robert William Anderson, Fenstanton; William Ralph Knowles, Royston; John Edward Culley, Arrington, all of England

[73] Assignee: Image Analysing Computers Limited, England

[22] Filed: July 8, 1975

[21] Appl. No.: 594,016

[30] Foreign Application Priority Data

July 26, 1974 United Kingdom ............ 33260/74
Sept. 20, 1974 United Kingdom ............ 41186/74

[52] U.S. Cl. .......................... 358/242; 178/DIG. 6; 178/DIG. 22; 178/DIG. 36; 340/324 A
[51] Int. Cl.$^2$ ........................................ H04N 7/18
[58] Field of Search ............... 178/6, 6.8, DIG. 33, 178/DIG. 36, DIG. 38; 18, DIG. 6, DIG. 22; 340/324 A, 360 D

[56] References Cited

UNITED STATES PATENTS

| | | | |
|---|---|---|---|
| 3,049,588 | 8/1962 | Barnett | 178/DIG. 33 |
| 3,292,489 | 12/1966 | Johnson | 340/324 A |
| 3,440,638 | 4/1969 | Van Valkenburg | 340/324 A |
| 3,506,875 | 4/1970 | Watanabe | 315/12 |
| 3,594,608 | 7/1971 | Mutton | 340/324 A |
| 3,651,508 | 3/1972 | Scarborough | 340/324 A |
| 3,715,480 | 2/1973 | Levine | 178/DIG. 33 |
| 3,757,037 | 9/1973 | Bialek | 178/18 |
| 3,806,642 | 4/1974 | Veith | 178/18 |
| 3,832,485 | 8/1974 | Pieters | 178/6.8 |
| 3,835,245 | 9/1974 | Pieters | 178/6.8 |

Primary Examiner—Richard Murray
Assistant Examiner—Michael A. Masinick
Attorney, Agent, or Firm—Oblon, Fisher, Spivak, McClelland & Maier

[57] ABSTRACT

Improvements and modifications are described to an image analyzing system in which an image of a field under analysis is displayed on a television monitor screen and features can be edited by adding or subtracting feature content to or from the display (and corresponding signal content to or from the signal which is to be processed for analysis) using a light pen.

One improvement provides for straight line interpolation between points in the display selected by the light pen during successive frame scans, so that a continuous trace and therefore corresponding signal is produced in the display corresponding to the path traced out by the light pen.

Another provides for an alarm signal to be generated if the storage facility used for storing the locus of the trace to allow its reconstruction during successive frame scans, becomes more than a given percentage occupied.

A further modification provides symbols to be displayed indicating the various editing functions which can be performed, one of which can be selected by the light pen.

A circuit is described for causing a brightened-up mark to appear in the display to indicate the point selected by the light pen and also to modulate the video signal within an outlined area to indicate visually that the area has been selected.

30 Claims, 13 Drawing Figures

METHODS AND APPARATUS INVOLVING LIGHT PEN INTERACTION WITH A REAL TIME DISPLAY

This invention concerns improvements in and relating to the methods and apparatus for image analysis described in U.S. patent Nos. 3,832,485 and 3,835,245.

As described in the two aforementioned specifications, a light pen may be employed to electronically delineate on the screen of a CRT lines which can either be used to define an area of particular interest or be used to modify the picture signal or a binary video signal obtained by threshold detection of the picture signal. Furthermore techniques and apparatus are described particularly with reference to FIGS. 4A, 4B, 5, 6 and 6A for generating pulses on scan lines between two points in the scan raster which are "seen" by the light pen. In other embodiments a pen tracker unit is described for achieving a similar result.

According to the present invention a method of image analysis in which a first video signal of an image of a field to be analysed is displayed on a television monitor screen and a light pen is successively positioned at a plurality of different points in the display to generate therefrom and in synchronism therewith an editing signal for editing signals relating to the field image as part of the analysis, the editing signal being such that if displayed on the television monitor it will appear in the display as a line which indicates the path followed by the pen, and in which the editing signal is stored in a memory so as to be available during subsequent frame scans, further comprising the steps of during a first frame scan storing a first position signal describing the position of one point in the raster seen by the light pen during that frame scan (the first point), storing during a subsequent frame scan a second position signal describing the position of a point seen by the light pen during the subsequent scan (the second point), generating short duration electrical pulses to occur during the scanning of any raster lines intermediate the lines containing the first and second points, said generated pulses being positioned along their respective lines so as together to define a straight line trace in the television display between said first and second points, and combining said short duration pulses with pulses occurring at said first and second points during the scanning to form at least a part of said editing signal.

Preferably the first position signal stored during a first frame scan is stored in a first store location and is shifted to a second location at the end of the first frame scan and the second position signal is stored during the next frame scan in said store location and the first and second position signals are shifted to a third and to said second store locations respectively at the end of the said second frame scan and the short duration electrical pulses defining the straight line between the two said points are generated by interpolation during the third frame scan from the two signals located for the duration of that scan in the said second and third store locations.

Preferably the process of generating the short duration electrical pulses comprises the steps of determining the distance (if any) in the direction of line scan between the said first point and the said second point, determining the number of line scans intermediate those containing the said first and second points and computing from said distance and said number of lines the incremental distance parallel to the line scan direction by which each said short duration electrical pulse must be shifted on each said intermediate line scan whereby the said straight line trace produced by said short duration pulses will start at the said first point in the scan and terminate at the said second point in the scan.

A method according to the invention may further comprise the steps of displaying words on or adjacent the television monitor screen to describe different editing functions which an editing signal can be used to perform on signals relating to the field image, selecting from the displayed words that word which describes the function which the editing signal is to perform, and causing the other words to be suppressed after selection of the one word.

The term as used herein is intended to include in addition to its normal meaning any symbol or device or group thereof capable of distinguishing one editing function from another.

Preferably the words are formed from characters of the so-called alphanumeric type and are displayed on the television monitor screen.

Conveniently the words are arranged to appear in a band across the top or bottom of the television display monitor screen and are superimposed over any first video signal display in that region of the screen. The display of the words may be called up by pointing the light pen at the region or band of the television monitor screen in which the words are to be displayed and operating a switch to call up the word display.

Conveniently the selection of one of the words in the display may be performed by pointing the light pen at the particular word and operating a switch to indicate that that particular word has been selected.

Where the memory employed for storing the editing signal has a finite capacity which is less than the capacity required to store an editing signal for every point in the scan field, the method according to the invention preferably also includes the step of generating a warning signal when a given percentage of the memory storage capability is occupied with editing signal.

It will be appreciated that once the memory is full it is subsequently impossible to write in any more editing signals, and a warning that the store is for example three-quarters full, is sufficient to enable the operator to adjust his program where necessary to alter the proposed locus of the light pen so as to close the line in the display where it is important that the trace outline is a closed loop for the particular function selected.

The means for indicating that a given percentage of the store is full may be an audible or a visible alarm or both. According to a preferred feature of the invention the warning comprises a modulation of the editing signal amplitude as applied to the television monitor to cause the line which is displayed to cyclically increase and decrease in brightness at a frequency of typically 2 or 3 cycles per second.

Alternatively, or in addition, a first switch means may be operated to cause the light pen to generate and store in a first store the said second video signal and a second switch means may be provided for making available a reserve store which forms, with the first store the total coordinate storage facility within the apparatus. In this way, as soon as the pen ceases to continue to generate a trace outline in the display, the second switch means may be operated and the reserve store employed.

Where a unique point is selected during each frame scan by circuit means responsive to the light pen output signal and at least one signal defining the position of the said unique point is stored in a store for subsequent reading during subsequent scans an improvement can be effected by arranging that the location of the said unique point is identified by a brightened-up symbol in the display, typically introduced by combining a suitable video signal which will produce the symbol in the display with the video signal of the field to be analysed supplied to the monitor.

Preferably the brightened-up symbol is a V-shaped outline with one side parellel to the line scan direction and the vertex of the V defining the selected point.

Where a given area in the television display has been outlined the invention preferably includes the step of modulating the amplitude of the video signals (or signals derived therefrom) which produce said given area in the display, to alter the brightness of the said given area whereby it is rendered readily distinguishable from the remainder of the display.

Preferably the modulation causes the said given area in the display to successively become brighter and darker at a rate of typically two or three times a second, or alternatively to produce a rectangular matrix of lines or rectilinear array of dots superimposed over the said given area.

Alternatively the modulation may be applied to the video signal corresponding to those areas outside the said given area.

The invention may also include the steps of: storing signals which define the outlined area in the television display, reading the stored signals in synchronism with subsequent scanning of the field and generating a signal in synchronism with the scanning which describes the position in the scan of the outlined area and comparing generated signal with signals arising during said subsequent scans of the field for the purpose of detecting any movement between scans of the said area relative to the remainder of the field.

The invention may also include the steps of storing signals describing a plurality of points in the scanned field, reading the stored signals in synchronism with subsequent scanning to produce a picture signal from the stored signals, displaying this signal on the television monitor screen and operating on the displayed signal using the light pen to edit the stored signals.

The invention may also include the step of storing either in electrical or photographic form the picture signal information contained in the television display after it has been edited by the light pen. In this way a record can be made of the edited signal which if reproduced in an appropriate manner can be used to reconstruct the edited picture.

It will be appreciated that whereas the television monitor display will usually be a full grey scale monochrome reproduction or full colour reproduction of the original field (depending on the type of image analysis system employed), the editing action of the light pen can be applied indiscriminately to any grey level or colour as displayed on the monitor screen or to selected levels or colours by the use of filters or to a selected grey level or colour using a coincidence circuit to inhibit editing except over video signal portions satisfying a given modulation criterion corresponding to grey level or colour.

The invention also includes apparatus for performing any of the methods previously described.

The invention will now be described by way of example with reference to the accompanying drawings, in which:

FIG. 1 is a block circuit diagram of part of an image analysis system in which a trace signal can be generated and used as an operator on a video signal from a light pen directed at a television display of the video signal and incorporating the first aspect of the invention, FIGS. 2(a), 2(b) and 2(c) indicate logic functions which are applied to the coordinate information signals stored in the registers of FIG. 1 in order to produce the electrical signal equivalents of certain functions of the coordinate values stored in the FIG. 1 registers, FIG. 3 is a block circuit diagram of further logic circuits for operating on the coordinate values stored in the FIG. 1 registers to produce further functions of the coordinate values which in conjunction with the previously produced functions can be used to solve an equation giving the positions along the intermediate lines at which a short duration pulse must be generated to produce straight line interpolation between selected points in the television display and for generating the short duration pulses to produce said straight line interpolation, FIG. 4 is a block circuit diagram of part of an image analysis system in which a plurality of words are displayed in a band on the television monitor and are selectable by means of a light pen to control the selected mode of operation of the image analysis system, FIG. 5(a) is an illustration of the television monitor of FIG. 4 with six function words displayed and FIG. 5(b) illustrates the same screen after the second function has been selected by the light pen of FIG. 4, FIG. 6 is a block circuit diagram of an addition to an image analysis system of a type shown in FIG. 1 in which the coordinate store capacity is insufficient to store the coordinates of all the points in the displayed area and which generates a warning signal when more than a centain percentage of the store has been used.

FIG. 7 is a block circuit diagram of a further circuit modification for causing selected regions in a television display to cyclically vary in brightness to render them more readily distinguishable from the remaining regions in the display, FIG. 8 is a block circuit diagram of a modification which may be employed in the circuit of FIG. 1 to cause an identifying symbol to appear in the display showing the precise point which is identified by the pen during each frame scan, FIG. 9 is a block circuit diagram of an alternative circuit to replace the AND gate 104 of FIG. 3, FIG. 10 is a block circuit diagram of an alternative circuit arrangement for use with FIG. 3, and FIG. 11 is a block circuit diagram of an additional circuit for generating control signals for the circuit of FIG. 9 from the output signals from the equality detectors 62 and 62' of FIG. 2(c).

GENERAL DESCRIPTION OF INVENTION

The system shown in FIGS. 1 and 2 and 3 of the drawings is concerned with mathematically interpolating between two points in a raster scan so as to produce a straight line between the two points and generate electrical pulses which when used to modulate the scanning beam producing the raster, generate the straight line trace in the television display.

Given two points in space whose coordinates are $(X1, Y1)$ and $(X2, Y2)$ then the horizontal increment S from line $Yn$ to $Yn+1$ i.e. the number of picture points per line (where each line can be thought of as comprising a large number of points joined together) is given by the formula $$S = X1 - X2/Y1 - Y2$$

(note that the value of S may be positive or negative depending on the slope of the line).

The general point $X(n + 1)$ can therefore be re-written as $Xn + S$ and using the formula above, this can be re-written again as:

$$X(n + 1) = Xn + \frac{X1 - X2}{Y1 - Y2} \quad (1)$$

Given that the total number of picture points per line is N (which is a constant) then equation (1) can be re-written as follows:

$$N - X(n + 1) = N - Xn - \frac{X1 - X2}{Y1 - Y2}$$

This can be re-written as $$(N - Xn + 1)(Y1 - Y2) = (N - Xn)(Y1 - Y2) - (X1 - X2)$$

This can be further re-written as $$(N - Xn)(Y1 - Y2) - (X1 - X2) - N(Y1 - Y2) + (Y1 - Y2)Xn + 1 = 0 \quad (2)$$

Hence by starting to check for this equality at line Y1 (it will become true at X1,Y1) and putting this first value for $Xn$ as X1 it is possible to determine each value of X i.e. $X(n +1)$, $X(n +2)$ etc., from the previous value for X (i.e. $Xn$) until X2 is reached.

In a line scanning system in which each line is N picture points long, the distance between any point $Xn$ along the line and the end of the line can be denoted by $N - Xn$. At this poiint in time, the end of line (EOL) signal occurs (= H.Trig.).

A further point of importance devolves from the fact that if N is expressed as a binary number N (Y1 – Y2) simply represents a shift of the binary number although, obviously the expression can be expanded by complex multiplication.

Using these formulae and facts when applying the various terms in equation (2) to a fixed raster scanning system, a computing circuit can be formed to solve the equations (2) for all values between (X1,Y1) and (X2,Y2). The computing circuit can be arranged to deliver a logic 1 signal at the appropriate instants in time during the raster scanning which correspond to the intersections of a straight line between the two points (X1,Y1) and (X2,Y2) and the intermediate scan lines. The logic 1 signals can be used to bright-up the television display at those points to produce a straight line trace in the display joining the two points (X1,Y1) and (X2,Y2).

The invention is of considerable importance since, when using a light pen to delineate a closed loop trace in a television display to for example denote one or more features wich are to be analysed or are to be rejected, it is essential that the loop is fully closed. If the coordinates defining the points along the trace are inserted one point per frame scan into the memory provided for their storage, it is possible to leave gaps in the trace by moving the light pen too quickly over the display surface. By employing the straight line interpolation circuit of FIGS. 1, 2 and 3, this problem can be obviated.

DETAILED DESCRIPTION OF DRAWINGS

Figure 1:
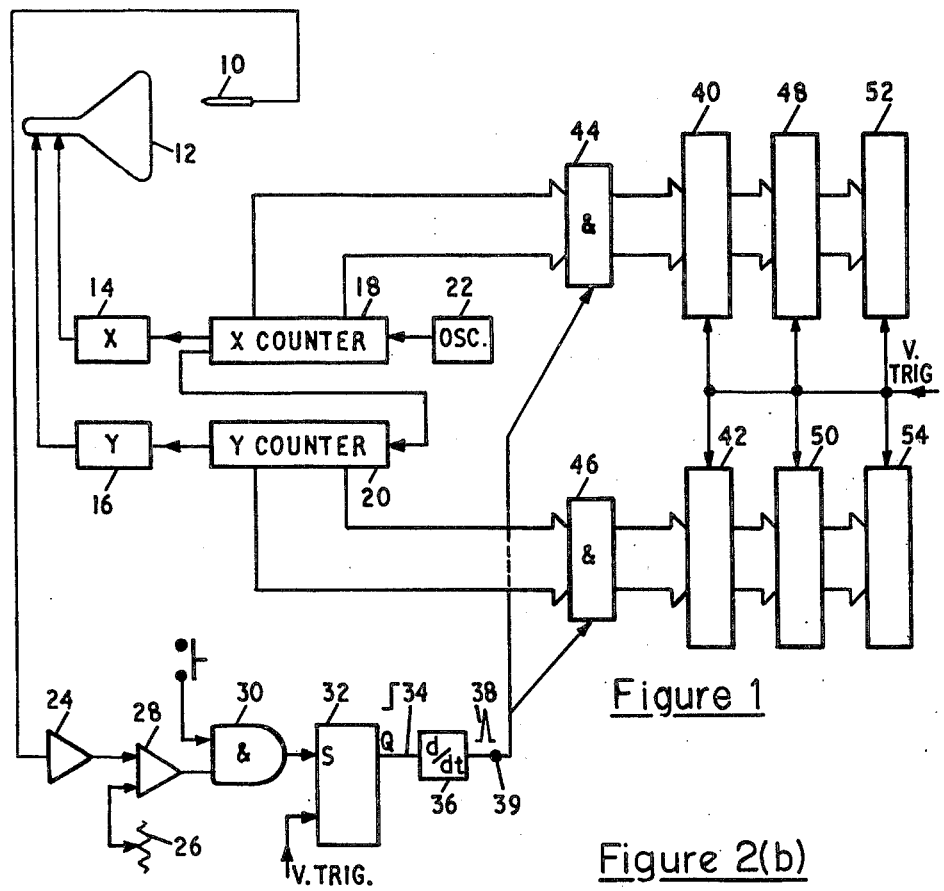

In FIG. 1 a light pen 10 is shown pointed at a CRT 12 the X and Y deflection currents therefor being derived from X and Y scan generators 14 and 16 respectively. These in turn are driven from two clocked counters 18 and 20, counter 18 being driven from a master clock oscillator 22 and counter 20 which provides one pulse at the end of each frame scan, being driven by the overflow output of counter 18. Each of the counters 18 and 20 is of the self-resetting variety.

The light pen 10 includes a photo-electric device (not shown) and optical system (not shown) which, when the pen is held within a few inches from the screen of the CRT 12 causes a small area of approximately ¼ to ½ inch diameter to be focused on the photo-electric device. The electrical characteristics of the latter change as soon as the spot which scans the CRT enters the field of view of the pen and this sudden change in the electrical characteristic is amplified by amplifier 24 after which the amplified voltage change is compared with a reference voltage of a potentiometer 26 by a comparator 28 to improve the signal-to-noise ratio of the signal.

The gain of the amplifier 24 and the operation of the threshold circuit 26, 28 is such that the threshold output signal is at a zero level except when the scanning spot is in the field of view of the pen, when the threshold output becomes a 1 level. The threshold output is gated by an AND gate 30 having a second input from a switch conveniently located on the light pen and operated by the fingertip. The switch may be of the push-button variety or more conveniently of the finger-contact type in which the electrical conductivity of the finger is used to complete a circuit. The circuit is such that when the switch is closed, a 1-signal is applied to the second input of the AND gate 30 which when the threshold output becomes 1, is satisfied and a 1 condition is applied to the set input of a bistable 32. The latter therefore is set when the scanning spot first enters the field of view of the light pen 10 during any particular frame scan and by applying the end of frame (EOF) signal (sometimes referred to as vertical trigger) to the reset input of the bistable 32, the latter will be reset at the end of each frame scan so that it is available to be set once again during the subsequent scan.

When set, bistable 32 produces a 1 signal along line 34 and a differentiating circuit 36 detects the leading edge of a change from 0 to 1 level on line 34 and produces a short duration pulse 38.

The latter is used as a loading signal to transfer the X and Y values from the two counters 18 and 20 into two shift registers 40 and 42 respectively. Since it is important that these values are transferred quickly, the information is transferred from the X and Y counters 18 and 20 in parallel form through multiple AND gates 44 and 46 and the loading signal 38 is applied as one input to each of the AND gate composites 44 and 46. When the signal 38 appears, the coordinate value from the X counter is loaded into register 40 and the Y coordinate value from counter 20 is loaded into the register 42.

The contents of registers 40 and 42 can be transferred to a second pair of registers 48 and 50 respectively and from registers 48 and 50 into a further pair of registers 52 and 54 respectively. In each case the transfer of information is in parallel form and to this end multiple connections are shown between the various registers. The transfer of binary number from register to register is achieved by applying the end of frame (vertical trigger) signal to the shift inputs of the registers 40 to 54 inclusive.

In this way the numerical values in registers 40 and 42 are transferred to registers 48 and 50 at the end of the frame scan in which they are inserted into the first registers 40 and 42 and at the end of the next following frame scan, these two numerical values are transferred yet again into registers 52 and 54 respectively. No transfer is provided beyond registers 52 and 54 and at the end of the next following frame scan the numbers originally stored in registers 52 and 54 are simply lost and replaced by the next numbers appearing in registers 48 and 50.

Thus if any particular frame scan is denoted as frame scan 1, and the next two frame scans as frame scans 2 and 3, the numerical values held in the registers 48 to 54 inclusive during the frame scan number 3 will be: in registers 52 and 54 the X and Y coordinates of the point selected by the light pen in frame scan number 1 and, in registers 48 and 50 the X and Y coordinates of the point selected by the light pen in frame scan number 2. These coordinate values are used during frame scan number 3 to generate a series of signals on line scans intermediate the two selected points (assuming they are different) so that a straight line will be generated in the display between the two selected points if the signals so generated are displayed as bright up signals in synchronism with the video signal and the scanning of the CRT 12.

Figures 2A, 2B:
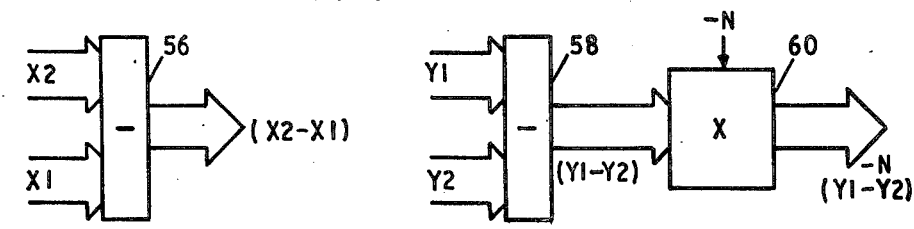
Figure 2C:
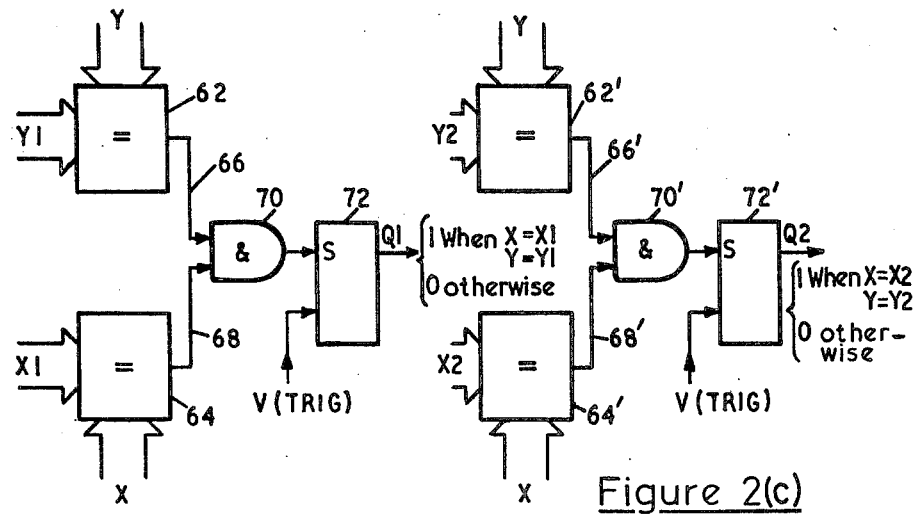
Figure 3:
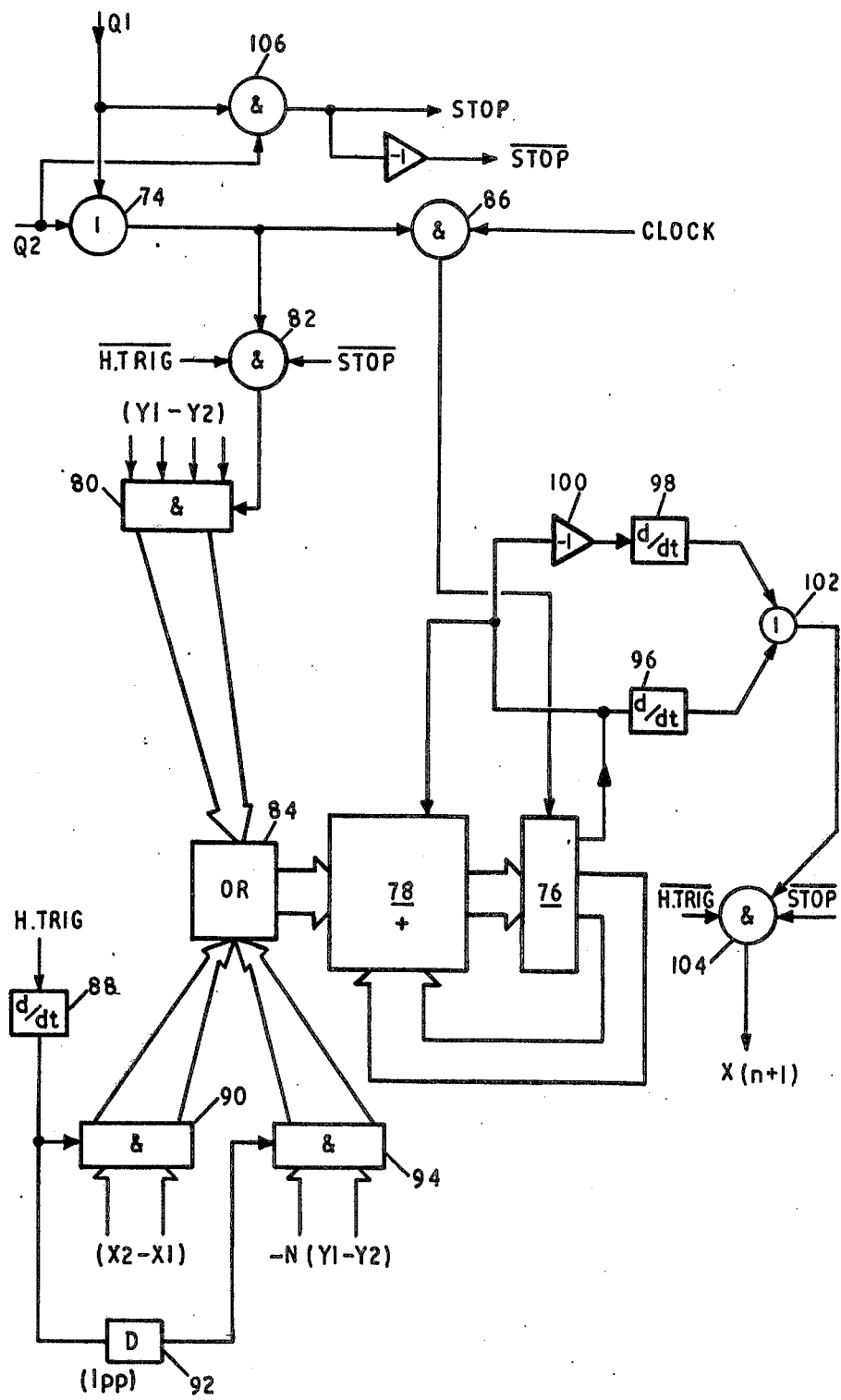

The interpolation is achieved using the logic circuits of FIGS. 2 and 3. The circuits are as follows:

As shown in FIG. 2(a), the digital values held in registers 52 and 48 are supplied to a subtraction device 56 to generate a binary signal corresponding to X2 − X1 (XN being the X coordinates of the selected point during frame scan N).

The circuit in FIG. 2(b) comprises a second subtraction device 58 which is supplied with the binary signals from registers 50 and 54 to produce a binary signal corresponding to the difference between register 54 value and register 50 value. This value is supplied to a multiplier device 60 having a multiplying factor N which is adjustable in value and is also adjustable in sign so as to produce a multiplication of −N x the difference output from device 58.

FIG. 2(c) comprises a pair of digital comparators 62 and 64 which are supplied with the binary values stored in registers 52 and 54 respectively and generate a 1 signal on their output lines 66, 68 respectively when the Y coordinate values from counter 20 (supplied to the other input of comparator 62) coincide with the value in the register 54 and the X coordinates from the X counter 18 (supplied to the other input of comparator 64) coincide with the value X1 from register 52. Coincidence between a 1 signal on the two output lines 66 and 68 is detected by an AND gate 70 which supplies a set signal to a bistable 72 which is reset at the end of each frame scan by the vertical trigger signal previously referred to.

The set output $Q_1$ of the bistable 72 thus indicates the point during the frame scan when the X and Y coordinates in the current frame scan coincide with the X and Y coordinates of the point selected during the first frame scan.

The circuit is duplicated by a second pair of digital comparators 62', 64' to which the binary signals contained in registers 50 and 48 respectively are supplied and a further AND gate 70' is satisfied when the X and Y coordinates in the current scan coincide with the X and Y coordinates of the selected point during the second frame scan and the output from the AND gate 70' sets a further bistable 72' which, as before, is reset by the vertical trigger signal at the end of each frame scan. Bistable 72' is thus set at the point during the current scan which coincides with the selected point during the second frame scan of the series i.e. point X2, Y2.

FIG. 3 of the drawings illustrates a further logic circuit for deriving from the numerical values of the signals from circuits 2(a) 2(b) and 2(c), the X coordinates along the lines between Y1 and Y2 at which a signal should be developed for producing a straight line interpolation between point defined by the coordinates X1, Y1 and the point X2, Y2.

When either bistable 72 or 72' is set, a start signal is generated via OR gate 74 which causes an initially empty shift register 76 to be loaded with a binary signal corresponding to the difference of Y1 − Y2. This is achieved using an adding stage 78 in combination with the register 76 which is supplied with the Y1 − Y2 signal from subtraction stage 58 of FIG. 2(b). This is supplied through a gate 80 which is opened by a 1 condition from the output of an AND gate 82 one input of which receives the start signal from OR gate 74, another input of which is responsive to the inverse of a stop signal ($\overline{STOP}$) to be described later and the other input of which receives the inverse of the horizontal trigger signal i.e. a signal which is 1 during a line scan but is 0 during the line flyback period.

The digital output from the gate 80 is applied through a composite OR gate 84 to one input of the adding stage 78 the other input of which is derived from the register 76. The register is reset by the vertical trigger pulse at the end of each frame scan.

The adding stage 78 and register 76 operates in a closed loop in response to subsequent clock pulses via AND gate 86 during the remainder of the line scan in which the value of Y1 − Y2 is loaded into the register 76. The operation of the adding stage 78 and register 76 being to sum the difference signal Y1 − Y2 by the number of clock pulses (and therefore picture points) between the point in that particular line scan and the end of the line scan denoted by vertical trigger. At the end of that line scan the value in the register 76 will correspond to the term in equation (2): (N − X1) (Y1 − Y2).

At the end of that line scan when the horizontal trigger pulse is generated, a differentiating circuit 88 produces a trigger pulse not greater than the interval between two clock pulses which is applied to open a gate 90 to release in parallel form the output from subtraction stage 56 (FIG. 1(a)) to the composite OR gate 84 so that this value is available for adding to the value in register 76 at the next clock pulse via AND gate 86. The trigger signal from differentiating stage 88 is also delayed by a 1 clock pulse interval delay device 92 and so as to open a further gate 94 one picture point later to release via the composite OR gate 84 the value from the multiplying stage 60 of FIG. 2(b). Referring to FIG. 1(a), it will be seen that subtraction stage 56 subtracts X1 from X2 which is mathematically equivalent to the reverse subtraction, i.e. X2 from X1 with a minus sign in front of it. The addition of the value from gate 90 to the value in register 76 thus produces the arithmetical value of the first two terms in equation (2) and the further addition of the value from gate 94 one picture point later produces the arithmetical value of the first three complete terms of equation (2).

At the beginning of the next line scan, the start signal will still be available to cause the value of Y1 − Y2 from subtraction stage 58 once again to be added via adding stage 78 at each clock pulse along the line scan to the value in register 76. It will be seen that from equation (2), the value in register 76 will pass through 0 at the point on that next line scan at which the value of X along that line scan satisfies the equation which is the solution which is desired.

The register 76 includes an output line which indicates according to the signal thereon (either 1 or 0) whether the sign of the numerical value in register 76 is positive or negative. A circuit connected to this sign-indicating line detects when the sign changes, to produce an output signal at that point along each line scan for which there is no stop signal. The input to the circuit is derived from the sign-indicating line from the register 76 and the circuit comprises two differentiating stages 96 and 98 the latter being supplied via inverting amplifier 100 to produce a positive going short duration pulse when the sign changes either from positive to negative or from negative to positive. The outputs from the differentiating stages 96, 98 are supplied via OR gate 102 as one input to an AND gate 104 which except during line flyback and when a stop signal is generated, is enabled and the short duration pulse from the OR gate 102 passes as an output signal labelled $X_n + 1$. This signal or an amplified version thereof can be employed as a bright up signal in the television display and will occur at the appropriate point along each of the intervening line scans between Y1 and Y2 to produce a straight line interpolation between the first detected point and the second detected point in the display.

The stop signal is generated when both of the bistables 72 and 72' are in a set condition and to this end a further AND gate 106 is provided with its two inputs connected to the two inputs of OR gate 74. AND gate 106 is thus enabled during the third frame scan at the coordinate position in the scan corresponding to the second detected point and is generated for all subsequent lines in that frame scan. The appearance of the stop signal inhibits gate 82 and gate 104 and thereby prevents the subsequent appearance of a bright up pulse in the output of gate 104. The register 76 is reset at the end of the third frame scan by the vertical trigger signal and the circuit is thus ready to receive two new different signals from the subtraction stages 56, 58 and multiplying stage 60 during the next frame scan so that if the light pen has been moved to select a further point, a straight line interpolation will occur during that next frame scan between the last two stored coordinate positions for the pen, stored in the registers 48 and 50 and 52 and 54.

Figure 4:
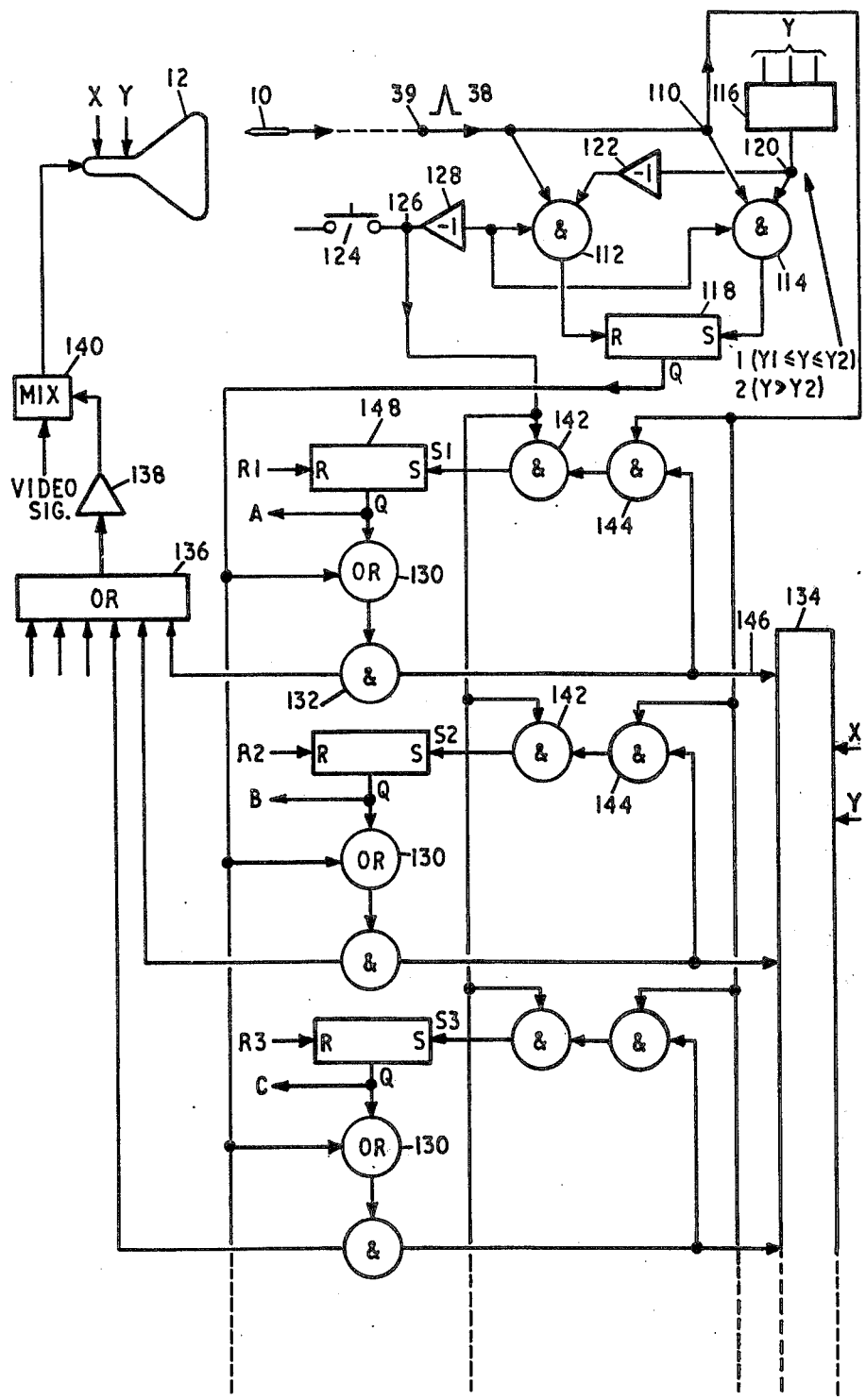
Figure 5:
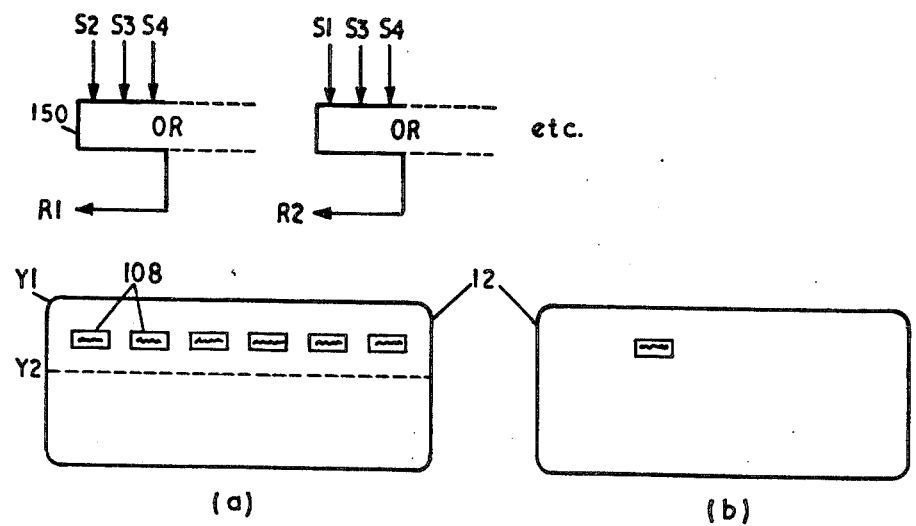

FIGS. 4 and 5 refer to a system for inserting a number of words describing different functions which can be performed by the apparatus of the type shown in FIG. 1 in a narrow band across the top of the CRT 12. The words are shown diagrammatically in FIG. (a) as a series of boxes 108 and the action of the circuit is to enable the boxes to be displayed or removed from the screen at will and to select one of the boxes and to display the selected box and word included within the box as shown in FIG. 5(b) to indicate the function which has been selected for the apparatus.

The light pen 10 supplies via a circuit such as shown in FIG. 1 a single pulse 38 at a unique point during each frame scan to a junction 110. The pulse 38 enables two AND gates 112 and 114 and depending on the output from a digital comparator 116 one or other of the AND gates 112 and 114 supplies a 1 signal to either reset or set, respectively, a bistable device 118.

The digital comparator 116 is supplied with the binary number from the Y counter 20 of FIG. 1 and the operation of the comparator 116 is to supply a 1 signal to junction 120 whilst the values of Y from the counter 20 lie in a range which define a band of lines across the top of the display of approximately 1½ inch depth from the top of the display. Any other value for Y produces a 0 in the output of comparator 116. Thus whilst the scanning spot is within the band of lines at the top of the screen, AND gate 114 receives a 1 signal from junction 120 but AND gate 112 is inhibited by the action of inverting amplifier 122.

A further input is provided for each of the AND gates 112 and 114 and this is derived from the switch shown diagrammatically at 124, provided on the light pen. When the switch is closed, a 1 signal appears at junction 126 and is inverted by inverting amplifier 128 to produce a 0 signal on the controlling inputs of the two AND gates 112 and 114. Thus if the switch 124 is closed, neither of the AND gates 112 and 114 can be fully satisfied and even if the light pen is directed at the appropriate band in the display, the bistable device 118 will remain in whatever condition it was last switched. If however the switch is opened while light pen 10 is looking at the particular band at the top of the display, AND gate 114 will be satisfied and bistable device 118 will be set by the output from the AND gate 114 when the pulse 38 from the light pen is received. The set output from bistable 118 provides a 1 signal which is applied as an input to six OR gates 130. The six OR gates are arranged in six similar circuits only one of which will be described in detail. The operation of each of the circuits is similar and can be deduced from the description of the action of one.

The output from OR gate 130 supplies an enabling signal to an AND gate 132 which is then able to pass, for the duration of the set condition of bistable 118 a binary coded signal from a box and word generator 134 which corresponds to one of the boxes and words 108 of FIG. 5(a). The binary coded signal is passed by AND gate 132 to a multiple OR gate 136 the output of which is amplified by a suitable amplifier 138 to produce a bright up signal which when mixed in a mixing stage 140 with the video signal and other signals for display on the CRT 12, will produce a suitably brightened display of the box and word within the box on the CRT display.

The box and word generator 134 is not described in detail since the form and construction of such device is well known to those skilled in the art. It is sufficient to describe the generator as comprising a series of registers each of which is capable of storing a binary coded signal which if released in synchronism with the line and frame scanning will produce the appropriate binary pulses at the correct positions along a plurality of consecutive line scans so that when used to modulate the brilliance of the scanning spot, a rectangular box outline and the appropriate letters forming a word within the box will appear in the display at the appropriate position. To this end the outputs from the binary counters 18 and 20 of FIG. 1 are shown supplied to the box and word generator 134.

It will be appreciated that although the term "word" has been used to describe the contents of each box, it is not necessary that letters or numerals are used and in place of the word, a symbol could be generated in place of the word to indicate the function which that particular selected mode of operation of the apparatus will produce.

The circuit described for one of the words and boxes 108 is duplicated for as many boxes and words as are to be displayed, the box and word generator 134 simply generating the appropriate box and word at the apropriate instant during the scan. It will be seen that the set condition of bistable 118 will enable all the AND gates 132 so as to release all the box and word signals for display on the screen. If the words are thought of as comprising a menu, the action of pointing the pen 10 at the band at the top of the display of the CRT 12 without closing the switch 124 will cause the menu to be displayed automatically. It will be seen however that if the pen 10 is moved, whilst the switch 124 is closed, into and out of the band at the top of the display, the menu will not be displayed. In this way it is possible to maintain the pen 10 in the writing-in or editing mode and use the full area of the CRT display for editing and amending the displayed video signal.

Having obtained the display of the menu, selection of one of the items on the menu is achieved by moving the pen 10 so as to register with the word describing the function which is required of the apparatus and closing switch 124. The action of this will cause a 1 signal to appear at junction 126 which will enable each of six AND gates 142 in the six separate box-word circuits previously mentioned. As before the action of only one of the AND gates 142 will be described in detail, the others will all function similarly.

The AND gate 142 has one other input which is controlled by the output of a further AND gate 144 (of which there are six — one for each of the box-word circuits). The AND gate 144 itself has two inputs one derived from the box-word output line from the box-word generator 134 and the other from junction 110. Thus in the event that the light pen 10 is looking at a point in the band at the top of the display which coincides with the area within the band defined by the box and word of that line 146, coincidence will be detected by the AND gate 144 and AND gate 142 will be enabled to pass the 1 condition from junction 126 if the switch 124 is closed. This short duration signal is designated S1 and constitutes a set signal for a bistable 148 of which there are six as previously described. The set condition of bistable 148 produces an output signal Q which is shown as a further output A which constitutes a further input to OR gate 130 and which when present, permanently enables the AND gate 132 for the line 146. In this way the box and word generator output along line 146 is maintained during subsequent frame scans so that that particular box and word will be permanently maintained irrespective of whether the other boxes and words are displayed.

The other boxes and words are removed from the display by the action of six multiple OR gates 150, of which only two are shown in FIG. 5. Each OR gate 150 has five inputs which are connected to the outputs of five of the AND gates 142 constituting set signals S1, S2, S3 etc. for the bistable 148. The output of each OR gate 150 is connected to the reset input of the one bistable 148 whose set input signal does not constitute an input for that particular OR gate 150. In this way the action of setting any one of the six bistables 148 automatically resets the other five.

It will also be noted that as soon as the pen 10 is removed from the upper band of the display and switch 124 is open, there will be a point during the succeeding frame scan when AND gate 112 will be fully satisfied causing register 118 to be reset and this will remove the 1 signal from the input to the OR gates 130 which will maintain the display on the screen until that 1 signal is removed.

The outputs A, B, C etc. from the set conditions of the bistables 148 may be used as gating signals to indicate to the remaining apparatus which of six functions is required and to cause the apparatus to be switched to perform that particular function. Thus the particular item in the menu will have been selected automatically and the apparatus switched to perform that selected function and the remainder of the display of the menu removed as soon as the light pen 10 is moved away from the selected item on the menu back into the lower part of the display.

Figures 6, 7:
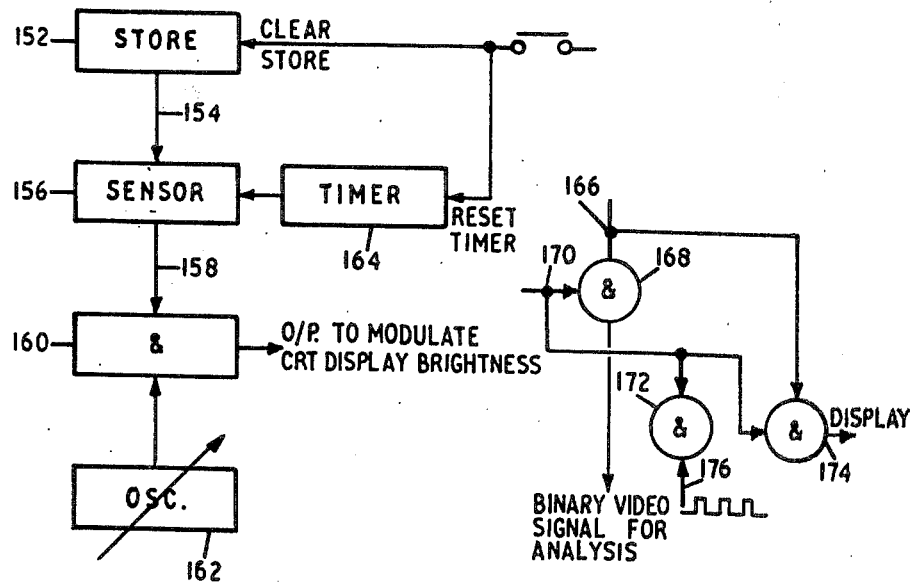

In FIG. 6 there is shown a circuit for causing the trace outline generated by the signal in the writing mode to begin to pulse in brightness when the store, into which the coordinate information signals relating to the trace are stored, has become more than a given percentage full. The store is shown diagrammatically at 152 and an overflow indication signal from store 152 is supplied along a line 154 to a sensor 156 when the store 152 is more than a given percentage full. The sensor generates a 1-signal along a line 158 which enables an AND gate 160 to pass modulating pulses from a low frequency oscillator 162 to control the brightness of the trace outline for example by modulating the gain of the amplifier amplifying the trace signal before it is mixed with the video signal and other signals for display on the CRT 12. The frequency of oscillator 162 is typically of the order of 2 cycles per second.

In addition the sensor 156 may be rendered time sensitive by employing a time clock circuit 164 which is set to 0 when the store 152 is cleared and produces an output signal equivalent to the overflow signal from store 152 at the end of a set period of time which is sensed by the sensor 156 in the same way to produce a 1 signal along line 158 and consequent pulsing of the brightness of the trace display after that period of time.

The block circuit diagram of FIG. 7 illustrates a circuit modification for causing selected regions in the television display to cyclically vary in brightness. To this end, the for example detected video signal (i.e. the binary video signal obtained by threshold detection of the analogue video signal obtained from scanning the field) is supplied to junction 166. A gating or eliminating signal from a circuit such as FIG. 9 or FIG. 10 of our co-pending Application No. 37226/71 now published as British Patent Specification No. 1,405,881 which corresponds to U.S. Pat. No. 3,832,485, in binary form is supplied to one input of an AND gate 168 the other input of which is supplied from junction 166. The output from AND gate 168 therefore constitutes the binary video signal on which measurements are to be made since it constitutes the selected portion or portions of the detected video signal as denoted by the outlines drawn by the light pen on the CRT display in the manner described in our aforementioned pending application.

The signal from junction 170 is also supplied as one input to an AND gate 172 which then enables a pulse signal of adjustable frequency and phase and mark-to-space ratio etc. which is in binary form and is supplied as the other input to AND gate 172, to be passed to a further AND gate 174 the other input of which is supplied from junction 166. In this way the regions in the display which correspond to those portions of the video signal which lie within the delineated outlines on the CRT are modulated by the signal applied along line 176 to AND gate 172. By arranging that the modulation causes the binary condition of the signal in the output of AND gate 174 to regularly become 0 for short intervals of time, the display of the binary video signal obtained by detection and selected by the delineated areas on the CRT display could be made to appear to be in the form of a lattice or cross-hatching. This will distinguish it from the other regions on the screen which also correspond to the detected binary signal and are brighted up in consequence but which are brightened up evenly over their entire area.

It will be seen that the circuit of FIG. 7 is representative of many possibilities so that the different modes of operation of the apparatus can be indicated clearly.

Figure 8:
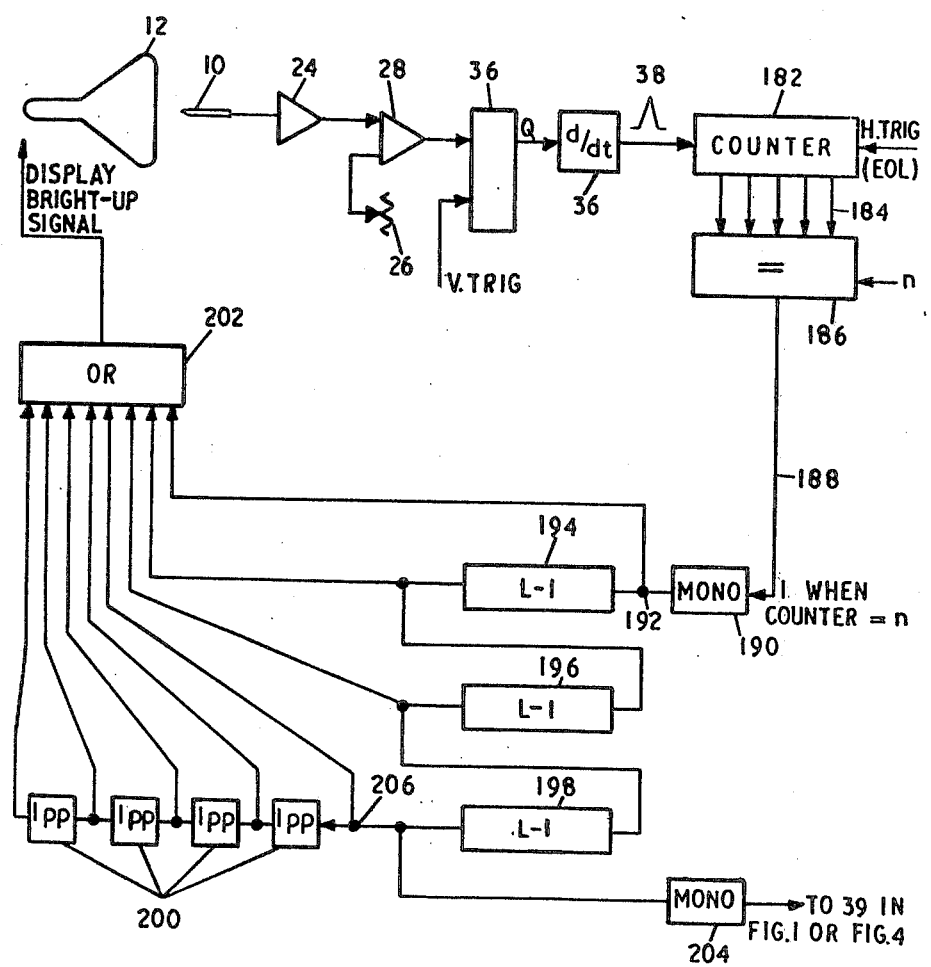

Lastly in FIG. 8 a block circuit diagram is shown for producing an arrowhead display in the CRT display indicating at the tip of the arrowhead the point which is actually going to be stored in the memory if the apparatus is instructed by closing switch 124 (shown in FIG. 4), to store the coordinate information signals relating to that point. The circuit of FIG. 8 is intended to be a modification which may be included within the circuit of FIG. 1 or FIG. 4 between the output of the differentiating stage 36 and point 39 in FIG. 1 and point 39 in FIG. 4.

The output signal 38 from differentiating stage 36 is supplied to reset a counter 182 which then counts the number of horizontal trigger signals or end of line signals (EOL) received after the counter has been reset to 0 until a particular number have been counted and denoted by a particular binary signal appearing on the output lines 184 of the counter 182. A digital comparator 186 detects the value $n$ in the output of counter 182 and generates a 1 signal along line 188 which triggers a monostable 190 to produce a short duration pulse at junction 192. This pulse is delayed in a series of separate shift registers 194, 196 and 198 and then in single bistable registers 200. The signal at junction 192 and the outputs from each of the registers 194, 196, 198 and each of the registers 200 is supplied as a separate input to a multiple OR gate 202 the output of which is supplied as a bright up signal for the display. By arranging that each of the shift registers 194, point spacing 198 delays the monopulse at 192 by one line scan period less one picture point and if the picture spacing along the lines is equivalent to the spacing between lines it will be seen that the trace of points produced by the delayed pulses from registers 194, 196, 198 will be at 45° to the scan direction. However the signals from the individual registers 200 will be parallel to the line scan direction and by deriving a further controlling pulse from a monostable 204 connected to the junction 206 constituting the output of the last long shift register 198, a signal will be obtained which corresponds in time to the point in the scan defined by the tip of the 45° line and the horizontal line in the display caused by the brighting up signals from OR gate 202. This signal from monostable 204 is then used as the point identifying signal and it is this signal which is used to address the X and Y registers for storing the coordinate information of a selected point in the memory bank (not shown) of the apparatus. In this way the point is well defined and can be easily seen on the display particularly if, as is conventional, the pen is inclined slightly downwards as in the ordinary writing position and the pen is slightly above eye-level of the operator.

In general the delineated line for joining or separating two features will lie at an angle to the line scan direction and if an interpolation circuit is provided this will be brought into play to cause an electrical signal to appear on any line scan which is missed by the light pen. The refinement as provided by FIGS. 9 to 11 now to be described, ensures that the coincidence detector will always find coincidence at one line scan period intervals between pulses from the interpolator on succeeding line scans. The signals from the interpolator may be combined with the detected signal pulses (either by adding or subtracting) and the two examples now to be described indicate the importance of coincidence being detectable at line scan intervals between such pulses from the interpolator circuit.

EXAMPLE 1

The electrical pulses forming the said second picture signal (i.e. the brightened up line scan segments in the display) may be used to separate electrically the sequence of electrical pulses which refer to two features which for one reason or another are "seen" by the imaging device producing the first picture signal to be touching. To achieve this, a continuous line of brightened up segments must be formed in the display between first and second points in the display so as to correspond to a series of "coincident" electrical signals which of appropriate polarity and combined with the so-called detected signal pulses obtained by threshold detecting the first picture signal, will remove those portions of the detected signal pulses which correspond in time with the electrical signals producing the brightened up line scan segments. In this way a gap will be made to appear in each of the detected signal pulses and since, by definition, a gap in the line scan direction between two electrical pulses indicates to a conventional image analysing computer that the two pulses relate to two different features, the signals relating to the joined features will be analysed by the analysing computer as arising from two separate features provided every one of the detected signal pulses relating to the joined features has been split into two.

EXAMPLE 2

The brightened up line scan segments can be used to connect together two features or two parts of a single feature which may have become separated for example in the preparation of a microscope slide, for analysis purposes. Again the electrical signals from which the signals are produced which cause the brightened up line scan segments in the display, may be combined with the detected signal pulses obtained by detecting the first picture signal relating to the field so that a continuous sequence of electrical signals (i.e. a signal on consecutive line scans) is available for the coincidence detector. In this way, by providing a sequence of such pulses so as to delineate a line between the two features in the display, the information which is computed from the detected signal pulses of the first feature to be scanned during the frame scan is held over at the normal release point for the feature (i.e. the anticoincidence point for the feature) from line scan to line scan, by virtue of the coincidence between the pulses forming the delineated line, and the information signal from the first feature to be scanned is combined with the information arising during scanning of the second feature and is added thereto so that at the anticoincidence point for the second feature a total of the information relating to the two features is available for release as the total information signal. As with the first example however, coincidence between pulses on consecutive line scans is essential for the two information signals to be combined.

General Rules governing the operation of the improved trace generating circuits.

Rule 1

Each horizontal line scan segment which together with other line scan segments generates a straight line trace in the display must be defined by two electrical pulses denoting the beginning and ending of each such line scan segment and in the general case where the line joining the said first and second points lies at an angle which is not at 0° or 90° to the line scan direction, these two electrical pulses defining the segment on each line comprises (1) an electrical pulse corresponding to the pulse generated on the previous line and delayed by one line scan period and (2) the pulse which is generated by the interpolating circuit described with reference to FIGS. 1 to 3.

Rule 2

No output signals must be allowed from the interpolator circuit on the line scan containing the first to be seen (during a frame scan) of two points which are to be joined using signals from the interpolating circuit.

Rule 3

Where the pulse that is calculated for the current line coincides with the pulse delayed from the previous line (i.e. the line joining the two points is perpendicular to the line scan direction) an additional electrical pulse must be generated after a short increment of time to define the end of the brightened up line scan segment on the current line scan.

Rule 4

Where the said first and second points in the display lie on the same line scan, the interpolator circuit must be inhibited and the electrical pulses defining the said first and second points must be released as the pulses defining the line scan segment on the current line scan which is to be brightened up.

Rule 5

Where the said first and second points coincide, the interpolator is once again to be inhibited and an additional signal must be generated a short increment of time after the two coincident pulses have appeared so as to indicate the end of the pulse causing the brightening of the line scan segment which begins when the two coincident pulses appear.

Figure 9:
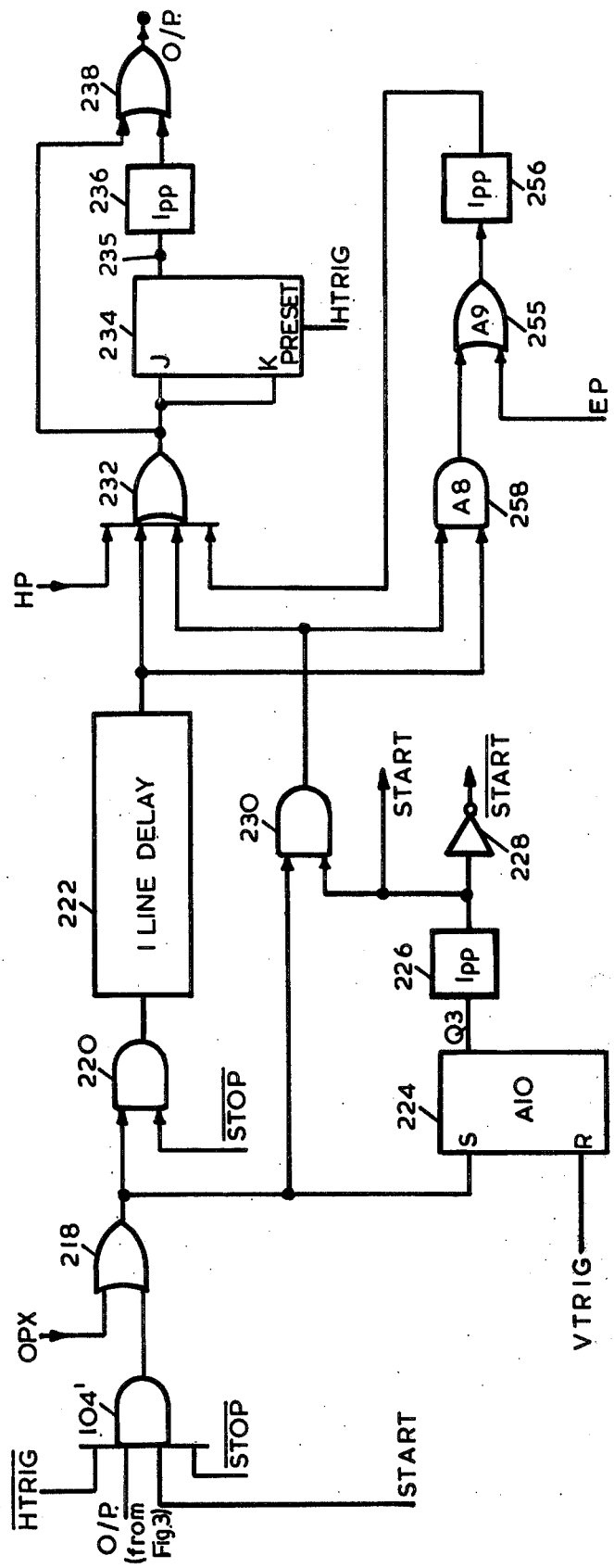
Figure 10:
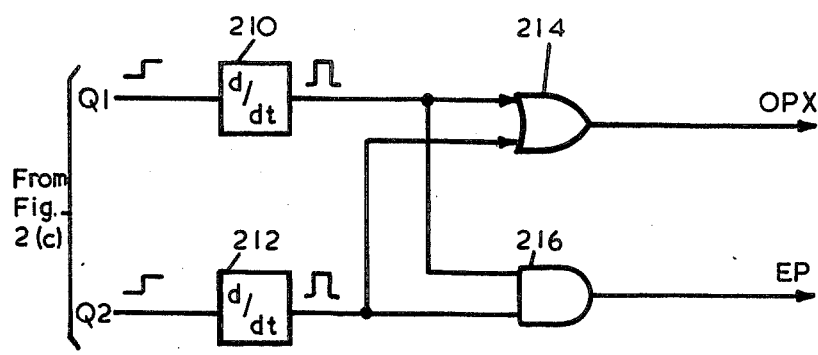
Figure 11:
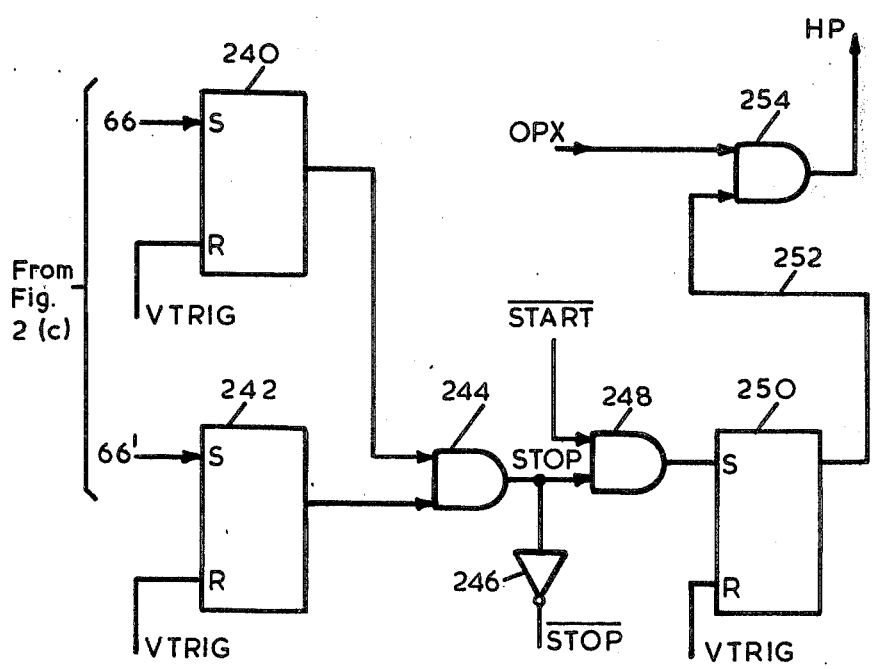

The following modifications are required in the circuits shown in FIGS. 1 to 3 of the accompanying drawings to permit them to be read in conjunction with FIGS. 9 to 11:

1. The equality indicating output signals from detectors 62 and 62' on signal paths on 66 and 66' in FIG. 2(c) must be brought out to provide input signals for the circuit of FIG. 11.
2. The function of generating the STOP and $\overline{\text{STOP}}$ signals is removed from the circuit of FIG. 3 and is contained within the circuit of FIG. 11.
3. AND gate 104 is replaced by a different AND gate 104' which appears in the circuit of FIG. 9.

Referring in detail first of all to the circuit of FIG. 10, the two output signals Q1 and Q2 from the circuits of FIG. 2(c) are supplied to two differentiating circuits 210 and 212 which are adapted to detect the leading edges of the pulses Q1 and Q2 and produce short duration pulses therefrom. The two output signals from the differentiating circuits 210 and 212 are supplied as two inputs to an OR gate 214 the output of which constitutes a signal denoted by OPX. They are also supplied as the two inputs to an AND gate 216 the output of which is denoted by the name Equal Points. It will be seen that where the two points denoted by the signals Q1 and Q2 coincide in the scan, the points can be described as equal (hence the name Equal Points for the AND gate 216, which is only enabled when both of the signals Q1 and Q2 occur at the same instant during the scan).

The OPX signal will thus constitute two short duration pulses in general one occurring before the other during the frame scan and the two pulses corresponding to the X position along respective line scans of the first and second points between which a straight line is to be interpolated. In general therefore, an OPX signal pulse will occur during the frame scan before any other signals are received by the new AND gate 104' of FIG. 9 and the OPX signal will pass through the OR gate 218 of FIG. 9 to provide an input to AND gate 220 which is enabled in the event that no STOP signal has yet been generated. The output from AND gate 220 is supplied to a one line delay device 222 which may conveniently comprise a clocked shift register.

It will be seen that the same OPX signal will set a bistable device 224 to produce a high output Q3 the leading edge of which is delayed by one picture point interval in delay device 226 to produce the START signal denoted in FIG. 9 and this signal constitutes an enabling input to a further AND gate 230 which is also supplied with the output from OR gate 218. An inverting amplifier 228 inverts the previous low output Q3 to produce a $\overline{\text{START}}$ signal.

It will thus be seen that the first OPX pulse during a scan will not pass through the AND gate 230 since the latter will not be enabled until one picture point later. However, the gate will be enabled for any output from OR gate 104' which occurs later in the scan. This AND gate is enabled after a START signal has been generated (previously described) and in the event that there is no STOP signal (generated from FIG. 11) and provided it is not during the horizontal trigger signal HTRIG. In this condition any pulse from the interpolating circuit of FIG. 3 which is released by the OR gate 102 of that circuit, will pass through the AND gate 104' and OR gate 218 and because it is enabled, the AND gate 220 into the one line delay device 222. In addition the same pulse from AND gate 104' and OR gate 218 will be supplied via AND gate 230 (which is now also enabled) as one input to an OR gate 232.

An output signal from OR gate 232 causes a JK Toggle bistable 234 to change state and the change in the set output of the bistable device (either from low to high or high to low) is delayed by a short delay device 236 for one picture point period and is thereafter supplied as an input signal to a further OR gate 238 the output of which constitutes the signal previously described as X($n$ + 1) in FIG. 3.

OR gate 238 has two inputs and the other input of this OR gate is supplied directly from the output of OR gate 232.

The operation of this part of the circuit can be considered as follows:

1. At the beginning of a line scan JK Toggle bistable 234 will be reset so that the signal at the output terminal 235 will be low.

2. If the line scan is one which does not intersect either of the first or second points which have been delineated in the scanned area nor a line joining these two points then no pulses will appear during that line scan at an input of the OR gate 232.

3. If the line scan contains the first of the said first and second points to be seen during a frame scan then the signal Q1 from FIG. 2 will go from low to high at that point along the line scan and as result of the differentiating stage 210 and OR gate 214, a single pulse will enter the delay line 222 via OR gate 218 and AND gate 220 but no corresponding pulse will appear on that line scan as input to OR gate 232. The position on that line scan is therefore the same as if the line scan had not intersected the said first or second point whichever occurs first in the frame scan direction, and JK Toggle bistable 234 remains in its reset position for the duration of the line scan.

4. If the line scan is subsequent to that described in condition 3 and provided the second to occur of the said first and second points has not been seen (i.e. Q2 is still low — see FIG. 2) then there will be one pulse in the delay device 222 from the previous line scan and bistable 224 will be in a set condition thereby enabling AND gate 230 so that during the line scan under consideration, the pulse from the OR gate 102 of interpolator circuit of FIG. 3 will appear at some point during the line scan in the input of OR gate 232 and will either be preceded or followed by the pulse from the delay device 232 delayed from the previous line scan. The first to occur of the two pulses will cause the JK Toggle bistable 234 to SET and the second to occur will cause the JK Toggle bistable 234 to RESET. The effect of the one picture point delayed device 236 is to delay the drop from a high level to a low level of the output of OR gate 238 for one picture point after the appearance of the leading edge of the second to occur of the two pulses applied to the input of Or gate 232.

5. If the line scan under consideration happens to be the one which contains the second to occur of the said first and second points after the beginning of the frame scan then the short pulse generated as Q2 rises from a low level to a high level (see FIG. 2) and generated by the differentiating stage 212 is passed by OR gate 214, OR gate 218 and AND gate 230 to one input of OR gate 232 and this together with the pulse from the delay device 222, from the previous line scan, provide the SET and RESET pulses for the JK Toggle bistable 234 for that line scan. However it is important that the pulse from differentiator 212 and OR gate 214 is not inserted into the delay device 222 since otherwise it will appear on the next line scan as an input signal to OR gate 232 and will cause a malfunction of the circuit. To prevent this the circuit of FIG. 11 is provided to generate a signal amongst others to inhibit AND gates 104' and 220 at the beginning of the line scan on which the second of the said first and second points to be seen during a frame scan lies.

Referring now to FIG. 11, at the beginning of the line scan on which lines the second to occur in the scanning direction of the said first and second points, both of the equality circuits 62 and 62' will be satisfied and the signals on lines 66 and 66' from FIG. 2 will both have a high value. This information can be used as provided in the circuit of FIG. 11 as follows:

Line 66 provides the SET input to a bistable device 240 and line 66' the SET each of the bistable devices 240 and 242 is RESET by the vertical trigger signal VTRIG. The SET outputs from the two bistables 240 and 242 are supplied as input signals to an AND gate 244 the output of which constitutes a STOP signal. The inverse of this signal is employed using inverting amplifier 246 (to produce $\overline{\text{STOP}}$) as the enabling signal for AND gates 104' and 220 and when the STOP signal is generated by AND gate 244, the inverse signal ($\overline{\text{STOP}}$) thereby inhibiting both AND gate 104' and AND 220. This occurs at the beginning of the line scan on which the second to occur of the said first and second points lies and it will be seen that this is the condition required in the last mentioned situation in the analysis of the operation of the JK Toggle bistable 234 the action of the collapse of the inverse STOP signal is to prevent the last pulse from differentiating circuit 212 on the line scan containing to occur of the said first and second points, from entering the delay device 222.

The remainder of the circuit of FIG. 11 is concerned with identifying when the first and second points lie on the same horizontal scan line so as to generate two pulses on that line, one indicating the beginning and the other the ending of the horizontal segment of that line scan which is to be brightened up. To this end a further AND gate 248 is provided one input of which is supplied with the output from AND gate 244 and the other is supplied with the output of inverting amplifier 238. AND gate 248 is now satisfied when a STOP signal is generated before a START signal is generated. This will only occur when the two Y value equality circuits 62 and 62' (see FIGS. 1 to 3) are satisfied at the beginning of one line scan because the values of Y1 and Y2 are equal. In this event the two bistables 240 and 242 will both be set at the beginning of that line scan thus producing a STOP signal in the output of AND gate 244 and if this occurs before a START signal has been generated on that line scan then AND gate 248 will be satisfied causing a bistable circuit 250 to be set and causing its output on line 252 to go high. Bistable 250 is reset at the end of each frame scan by the vertical trigger signal VTRIG.

The SET signal from bistable 250 provides one input for a further AND gate 254 the other input of which comes from OR gate 214 and the output of AND gate 254 provides a further input for OR gate 232. Thus when AND gate 248 is enabled, the first to occur of Q1 and Q2 causes a pulse to appear in the output of OR gate 232 thereby setting the previously reset JK Toggle bistable 234 and the second to occur of Q1 and Q2 produces, likewise a pulse in the output of OR gate 232 which causes the JK Toggle to once again reset. Since Q1 and Q2 represent the satisfaction of the X and Y coordinates for the two first and second points selected in the display, the first of the pulses to occur in the output of OR gate 232 under these conditions represents the beginning of the horizontal line scan segment and the second to occur represents the end of the segment which lies between these first and second points.

If it so happens that the first and second selected points are coincident then both X1 and X2 and Y1 and Y2 have the same values. This will cause the two differentiating circuits 210 and 212 to produce short duration pulses simultaneously and this fact is used to distinguish the coincident point situation from the horizontal straight line situation. However before that information is employed, the circuit formed by a combination of the circuits of FIGS. 10 and 11 produces a pulse in the output of AND gate 254. This is achieved by virtue of the fact that at the beginning of that line scan both Y1 and Y2 will have been satisfied and the outputs of lines 66 and 66' will have gone high causing bistables 240 and 242 both to set and thereby producing a STOP signal before a START signal has been generated. As previously described, this causes AND gate 248 to be satisfied and causes bistable device 252 to SET thus enabling AND gate 254 so that any pulse appearing in the output of OR gate 214 will pass through AND gate 250 to appear as an input pulse to OR gate 232 so as to set JK Toggle bistable 234.

However, where the two first and second points coincide on the line scan, AND gate 216 will be satisfied since both of the pulses from differentiating circuits 210 and 212 arrive simultaneously and the short duration pulse which appears in the output of AND gate 216 is supplied to one input of an OR gate 255 in FIG. 9. The output of OR gate 255 is delayed by one picture point interval by delay device 256 the output of which provides the reset signal for JK Toggle 234 via OR gate 232. Thus when the two differentiated pulses from 210 and 212 occur simultaneously, the first pulse which is transferred via AND gate 254 and OR gate 232 and which sets JK Toggle bistable 234, is followed one picture point interval later by a second pulse derived from the coincidence of the two differentiated pulses thereby causing the JK Toggle bistable 254 to reset once again. The resulting signal in the output of OR gate 238 is thus of duration equal to two picture point intervals.

It will be appreciated that the operation of the JK Toggle bistable 234 requires two distinct pulses to appear in the output of OR gate 232 on each line scan on which an output pulse is to appear. The first pulse defines the beginning and the second pulse the ending of the segment on that line scan which is to be brightened up. Where the two pulses are derived one from the delay device 222 and the other from the AND gate 230, this presupposes that the two pulses are separated in time. This will not be the case where the line which is being interpolated is perpendicular to the line scan direction since in that event, the delayed pulse from the previous line will occur at the same instant in time on the next line scan as the pulse from AND gate 230 and since the two pulses will both be supplied at the same instant to OR gate 232, there will be no "second pulse" in the output of OR gate 232 to reset JK toggle bistable 234 on that line scan.

This problem is obviated by providing a further AND gate 258 one input being supplied with the output pulses from AND gate 230 and the other with the output pulses from delay device 222. When both pulses occur simultaneously as is the case when the line is perpendicular to the line scan direction, AND gate 258 is satisfied thereby causing a short duration pulse to be transferred via OR gate 255 and one picture point delay device 256 to the input of OR gate 232. The delay introduced by the device 256 is sufficient to separate this delayed pulse from the first to appear formed by the coincidence of the two from gate 230 and delay device 222. In this way the SET and RESET signals are obtained for the JK toggle bistable 234.

It is to be understood that the assumption has been made that the bistable devices referred to in this Application operate instantaneously and change state on the leading edge of the triggering signals. In practice this is not always possible to achieve and where a delay occurs between the leading edge of a triggering signal and the appearance of a corresponding rise or fall in the output signal of the bistable device, compensating delays are introduced into the circuits or, preferably, a so-called clocked circuit is employed which inhibits the changing of state of devices such as bistables and gates etc. except at regularly occurring points in time defined by a master oscillator which produces so-called clock pulses which are supplied to appropriate points in the circuit in known manner.

It will be appreciated that the signals in the output of OR gate 238 of FIG. 9 can be used directly or after amplification to brighten up line scan segments in the final display and the same signals can be used either directly or in combination with other signals or after suitable processing so as to produce so-called "infill" or "gating signals" to eliminate certain sections of the video signal relating to the field or detected signal pulses obtained from threshold detection or other signal processing of the video signal relating to the field. In addition the pulses either themselves (or after being processed to produce infill signals and standardised to produce pulses of constant amplitude) may be combined either by addition or subtraction with the detected signal pulses which themselves will be constant amplitude pulses, obtained by threshold detecting the analogue video signals obtained from scanning the original field, so as to construct new detected signal pulses which are longer or shorter than those actually produced by the threshold detection. In this way the actual detected signals can be "edited" and as previously mentioned, using the gating technique described in our co-pending British patent application No. 37226/71, selected features or regions in the field can be edited from the remainder of the field.

We claim:

1. A method of image analysis in which a video signal of an image of a field to be analyzed is displayed on a television monitor screen and a light pen is moved relative to the display to generate therefrom and in synchronism therewith an editing signal for editing signals relating to the field image as part of the analysis, the editing signal being such that if displayed on the television monitor it will appear in the display as a line which indicates the path followed by the pen, and in which the editing signal is stored in a memory so as to be available during subsequent frame scans, further comprising the steps of:

during one frame scan storing a position signal describing the position of one point only in the raster seen by the light pen during that frame scan, storing during a second frame scan a position signal describing the position of another single point seen by the light pen during that scan, generating by interpolation during a third frame scan short duration electrical pulses to occur during the scanning of any raster lines intermediate the lines containing the point seen during the said one frame scan and the point seen during the said second frame scan, said generated pulses being positioned along their respective lines so as together to define when displayed a straight line trace in the television display between the two said points; and storing said interpolated short duration pulses in the memory with pulses occuring at the two said points during the scanning to form a least a part of said stored editing signal.

2. Method as set forth in claim 1 which also includes the step of generating a warning signal when a given percentage of the memory storage capability is occupied with editing signal.

3. A method as set forth in claim 1 in which: the position signal which is stored during a first frame scan is stored in a first store location and is shifted to a second location at the end of the first frame scan and the position signal which is stored during the next frame scan in said store location and the position signals stored during said first and second frame scans are shifted to a third and to said second store locations respectively at the end of the said second frame scan and the short duration electrical pulses defining the straight line between the two said points are generated by interpolation during the third frame scan from the two signals located for the duration of that scan in the said second and third store locations.

4. A method as set forth in claim 3 in which said step of generating comprises the steps of: determining the distance in the direction of line scan between the said first point and the said second point, determining the number of line scans intermediate those containing the said first and second points and computing from said distance and said number of lines the incremental distance parallel to the line scan direction by which each said short duration electrical pulse must be shifted on each said intermediate line scan whereby the said straight line trace produced by said short duration pulses will start at the said first point in the scan and terminate at the said second point in the scan.

5. A method as set forth in claim 1 further comprising the step of storing the picture signal information contained in the television display after it has been edited by the light pen.

6. A method as set forth in claim 5 wherein the storage is electrical.

7. A method as set forth in claim 5 wherein the storage is photographic.

8. Method as set forth in claim 7 further comprising storing either in electrical or photograph form the picture signal information contained in the TV display after it has been edited by the light pen.

9. A method of image analysis in which a first video signal of an image of a field to be analysed is displayed on a television monitor screen and a light pen is successively positioned at a plurality of different points in the display to generate therefrom and in synchronism therewith an editing signal for editing signals relating to the field image as part of the analysis, the editting signal being such that if displayed on the television monitor it will appear in the display as a line which indicates the path followed by the pen, and in which the editing signal is stored in a memory so as to be available during subsequent frame scans, further comprising the steps of:

displaying symbols on the television monitor screen to describe different editing functions which an editing signal can perform on signals relating to the field image, selecting from the displayed symbols that symbol which describes the function which the editing signal is to preform; and causing the other symbols to be suppressed after selection.

10. A method as set forth in claim 9 in which the symbols are words.

11. A method as set forth in claim 10 in which the words are arranged to appear in a band across the television display monitor screen and are superimposed over any first video signal display in that region of the screen.

12. A method as set forth in claim 9 in which the display of the symbols is called up by pointing the light pen at the region or band of the television monitor screen in which the symbols are to be displayed and operating a switch to call up the display.

13. A method as set forth in claim 12 in which the selection of one of the symbols in the display is performed by pointing the light pen at the particular symbol and operating a switch to indicate that that particular symbol has been selected.

14. A method of image analysis in which a first video signal of an image of a field to be analyzed is displayed on a television monitor screen and a light pen is successively positioned at a plurality of different points in the display to generate therefrom and in synchronism therewith an editing signal for editing signals relating to the field image as part of the analysis, the editing signal being such that if displayed on the television monitor it will appear in the display as a line which indicates the path followed by the pen, and in which the editing signal is stored in a memory so as to be available during subsequent frame scans, further comprising the steps of:

generating a display bright-up signal in response to the interaction between the pen and the display; and supplying the bright-up signal to the monitor to produce in the display a brightened-up symbol substantially larger than a point for indicating the point in the display which will be recorded in the memory.

15. A method as set forth in claim 14 in which the brightened-up symbol is a V-shaped outline with one side parallel to the line scan direction and the vertex of the V defining the selected point.

16. A method of image analysis in which a first video signal of an image of a field to be analyzed is displayed on a television monitor screen and a light pen is successively positioned at a plurality of different points in the display to generate therefrom and in synchronism therewith an editing signal for editing signals relating to the field image as part of the analysis, the editing signal being such that if displayed on the television monitor it will appear in the display as a line which indicates the path followed by the pen, and in which the editing signal is stored in a memory so as to be available during subsequent frame scans, further comprising the steps of:

moving the pen so as to outline an area in the display, generating a modulating signal, gating the modulating signal with signals derived from the editing signal; and modulating the amplitude of the video signal which produces said given area in the display, to alter the brightness of the said given area whereby it is rendered readily distinguishable from the remainder of the display.

17. A method as set forth in claim 16 in which the modulation causes the said given area in the display to successively become brighter and darker.

18. A method as set forth in claim 16 in which the modulation produces a rectangular matrix of lines or dots superimposed over the said given area.

19. A method of image analysis in which a first video signal of an image of a field to be analysed is displayed on a television monitor screen and a light pen is successively positioned at a plurality of different points in the display to generate therefrom and in synchronism therewith an editing signal for editing signals relating to the field image as part of the analysis, the editing signal being such that if displayed on the television monitor it will appear in the display as a line which indicates the path followed by the pen, and in which the editing signal is stored in a memory so as to be available during subsequent frame scans, further comprising the steps of:

moving the pen so as to outline an area in the display,
storing signals which define the outlined area in the television display,
reading the stored signals in synchronism with subsequent scanning of the field and generating a signal in synchronism with the scanning with describes the position in the scan of the outlined area; and
comparing the generated signal with signals arising during said subsequent scans of the field for the purpose of detecting any movement between scans of the said area.

20. A method of image analysis in which a first video signal of an image of a field to be analysed is displayed on a television monitor screen and a light pen is successively positioned at a plurality of different points in the display to generate therefrom and in synchronism therewith an editing signal for editing signals relating to the field image as part of the analysis, the editing signal being such that if displayed on the television monitor it will appear in the display as a line which indicates the path followed by the pen, and in which the editing signal is stored in a memory so as to be available during subsequent frame scans, further comprising the steps of:

storing signals describing a plurality of points in the scanned field,
reading the stored signals in synchronism with subsequent scanning to produce a picture signal from the stored signals,
displaying this signal on the television monitor screen; and
operating on the displayed signal using the light pen to edit the stored signals.

21. Apparatus for performing image analysis comprising a television monitor for displaying a first video signal of an image of a field to be analyzed, a light pen for successively selecting a plurality of different points in the display to generate therefrom and in synchronism with the scanning an editing signal for editing signals relating to the field image as part of the analysis, first means for supplying the editing signal to the television monitor to appear in the display as a line which indicates the path followed by the pen, a memory for storing signals arising during scanning, second means for causing to be stored in the memory a first position signal describing the position of one point in the raster seen by the light pen during a first frame scan (the first point), third means for causing to be stored in the memory during a subsequent frame scan a second position signal describing the position of a point seen by the light pen during the subsequent scan (the second point), fourth means for generating short duration electrical pulses during the scanning of any raster lines intermediate the lines containing the first and second points, at points therealong which together define a straight line trace in the television display between said first and second points, and fifth means for combining said short duration pulses with pulses occurring at said first and second points during the scanning to form at least a part of said editing signal.

22. Apparatus as set forth in claim 21 wherein said fourth means includes interpolating circuit means for interpolating the positions in the raster at which the short duration pulses are to be generated.

23. Apparatus for performing image analysis comprising a television monitor for displaying a first video signal of an image of a field to be analysed, a light pen for successively selecting a plurality of different points in the display to generate therefrom and in synchronism with the scanning an editing signal for editing signals relating to the field image as part of the analysis, first means for supplying the editing signal to the television monitor to appear in the display as a line which indicates the path followed by the pen, a memory for storing signals arising during scanning, signal generating means for generating electrical signals which when displayed will produce symbols on the television monitor screen, different symbols indicating different editing functions which an editing signal can perform on signals relating to the field image, means for selecting from the displayed symbols that symbol which describes the function which the editing signal is to perform and causing the other symbols to be suppressed after selection.

24. Apparatus as set forth in claim 23 in which the symbols are words.

25. Apparatus as set form in claim 24 in which the words are arranged to appear in a band across the top or bottom of the television display monitor screen and are superimposed over any first video signal display in that region of the screen.

26. Apparatus for performing image analysis comprising a television monitor for displaying a first video signal of an image of a field to be analyzed, a light pen for successively selecting a plurality of different points in the display to generate therefrom and in synchronism with the scanning an editing signal for editing signals relating to the field image as part of the analysis, first means for supplying the editing signal to the television monitor, to appear in the display as a line which indicates the path followed by the pen, a memory for storing signals arising during scanning, and means for releasing a display bright-up signal in response to the interaction between the pen and the display to produce in the display a brightened-up symbol substantially larger than a point for indicating the point in the display which will be recorded in the memory.

27. Apparatus for performing image comprising a television monitor for displaying a first video signal of an image of a field to be analysed, a light pen for successively selecting at a plurality of different points in the display to generate therefrom and in synchronism with the scanning an editing signal for editing signals relating to the field image as part of the analysis, first means for supplying the editing signal to the television monitor, to appear in the display as a line which indicates the path followed by the pen, a memory for storing signals arising during scanning to enable the pen trace to be displayed during subsequent scans, gating means whereby a modulating signal is gated by signals derived from an editing signal corresponding to a closed delineated outline for modulating the amplitude of the video signal which produces said given area in the display, to alter the brightness of the said given area whereby it is rendered readily distinguishable from the remainder of the display.

28. Apparatus for performing image analysis comprising a television monitor for displaying a first video signal of an image of a field to be analysed, a light pen for successively selecting a plurality of different points in the display to generate therefrom and in synchronism with the scanning an editing signal for editing signals relating to the field image as part of the analysis, first means for supplying the editing signal to the television monitor, to appear in the display as a line which indicates the path followed by the pen, a memory for storing signals arising during scanning to enable signals which define an outlined area in the television display to be stored, reading the stored signals in synchronism with subsequent scanning of the field, means for generating therefrom a signal in synchronism with the scanning which describes the position in the scan of the outlined area, and comparison means for comparing the generated signal with signals arising during said subsequent scans of the field for the purpose of detecting any movement between scans of the said area.

29. A method of image analysis in which a first video signal of an image of a field to be analyzed is displayed on a television monitor screen and a light pen is successively positioned at a plurality of different points in the display to generate therefrom and in synchronism therewith an editing signal for editing signals relating to the field image as part of the analysis, the editing signal being such that if displayed on the television monitor it will appear in the display as a line which indicates the path followed by the pen, and in which the editing signal is stored in a memory so as to be available during subsequent frame scans, further comprising the steps of:

during a first frame scan storing a first position signal describing the position of one point in the raster seen by the light pen during that frame scan, storing during a subsequent frame seen a second position signal describing the position of a point seen by the light pen during the subsequent scan, generating short duration electrical pulses to occur during the scanning of any raster lines intermediate the lines containing the first and second points, said generated pulses being positioned along their respective lines so as together to define a straight line trace in the television display between said first and second points, combining said short duration pulses with pulses occurring at said first and second points during the scanning to form at least a part of said editing signal; and, generating a warning signal when a given percentage of the memory storage capability is occupied with an editing signal.

30. A method as set forth in claim 9 in which the warning comprises a modulation of the editing signal amplitude as applied to the television monitor to cause the line which is displayed to cyclically increase and decrease in brightness at a low frequency.

* * * * *